Patented Apr. 5, 1949

2,466,145

UNITED STATES PATENT OFFICE 2,466,145

STABILIZED SOREL CEMENT AND METHOD OF MAKING

Leslie W. Austin, San Jose, and Daniel Rhodes, Palo Alto, Calif., assignors to The Permanente Metals Corporation, Oakland, Calif., a corporation of Delaware No Drawing. Application May 16, 1945, Serial No. 594,173

11 Claims. (Cl. 106—106)

This invention is concerned with a process for the production of cements of the Sorel type, and particularly of cements of the magnesium oxychloride and oxysulfate type, and with the product so obtained.

Magnesium oxychloride and magnesium oxysulfate cements have long been used and have been known to have the advantages of great strength, short curing time, resilience, plasticity and the ability to bond well to a variety of materials. However, the use of such cements has been considerably restricted in the past because of certain disadvantages. For instance, the constituents of these cements have an appreciable solubility in water and the cements are undesirable for use where exposed to weather or high humidities, or to continued scrubbing and mopping. Furthermore these cements exhibit considerable dimensional changes during setting and for some time thereafter, to the extent even that cracking and warping occur.

Among the objects of this invention is the production of a cement which has improved resistance to moisture or water and which also has improved volume stability and increased strength. Other objects will be made manifest by the description below.

It has been found according to this invention that the above disadvantages can be overcome and the aforesaid objects attained and an improved cementitious material obtained by incorporating in such cements amorphous silica having a major proportion of particles of substantially colloidal dimensions, such as the very finely divided amorphous silica obtained by deposition of solid silica from the vapor phase. The Sorel cement of this invention can be prepared by treating an admixture of magnesium oxide and finely divided amorphous silica as described herein with an aqueous solution of magnesium chloride.

The silica useful in this invention can be produced in various ways. For example, it may be prepared by rapidly condensing solid silica from its vapor state whereby it is obtained in highly subdivided form and in the amorphous state. It may be obtained by subliming crystalline or coarse silica material under suitable temperature conditions or it may be obtained by the vapor phase oxidation of silicon or a lower oxide of silicon, and subsequent deposition of solid silica to obtain the product in very small particle size. Preferably, the silica is rapidly condensed from the vapor phase to recover finely divided, amorphous silica.

One convenient method of obtaining the silica useful in this process is to recover that formed in the production of ferrosilicon which is a well-known alloy of iron and silicon useful in various metallurgical processes. The ferrosilicon is usually produced by reacting a siliceous material of coarse or crystalline nature, such as quartz, in an electric arc furnace with iron and a reducing agent such as carbon whereby the quartz is reduced by the carbon and the silicon produced enters into combination with the iron, forming the desired ferrosilicon. During the operation vapors are evolved and there is recovered, from the gases passing out of the reaction zone, silica which is amorphous and which is also in a very finely divided state. The mechanism of the formation of this silica has not been fully determined but it may arise in one or more of several ways. The silica which is obtained is deposited from the vapor, with recovery of finely divided solid silica. The silica as it is present in the vapors may, as indicated, arise in several ways; that is to say, some of the original silica may have been vaporized, or it may have been reduced to silicon and the silicon which is vaporized is then reoxidized to silica in the exhaust gas in contact with an oxygen-yielding gas and is deposited in the amorphous, finely divided state; or some of the silica may be reduced in the reaction zone to lower oxide of silicon, such as silicon monoxide for example, and this compound then re-oxidized to silica in the issuing vapors when it comes into contact with an oxygen-yielding gas, such as air, silica then depositing in the manner described above. Whatever the mechanism of the reaction, the silica recovered as a deposit from the exhaust gases is in the form of amorphous spherical particles and its physical properties are characteristic, as indicated, for example, by its amorphous condition and great degree of subdivision, the particle size averaging about 330 millimicrons in diameter and the particles being predominantly less than 1 micron in diameter. In fact, somewhat more than 67% of the particles are below one micron in size, while only negligible amounts of particles below one micron in diameter are present in silicas obtainable from amorphous silica or powdered diatomaceous earths, for example, known to the art. The silica is a dust or very fine flour having a specific surface of about 67,500 square centimeters per gram.

The silica fume can also be produced by reducing quartz, or coarse or crystalline $SiO_2$, with carbonaceous or other suitable reducing agent, treating the vaporous products of the reduction with an oxygen-yielding gas and recovering deposited solid silica in very finely divided form as described above. The vapors containing or forming silica are at high temperatures and can be rapidly cooled by mixing them with a stream of air at atmospheric temperatures.

The proportion of the silica as described which is added in the cement mixes varies according to the results or objects desired. The mechanism of the action by which an addition of such silica effects the stated improvements in oxychloride cements has not been determined, but the advantageous results are illustrated by the examples given below.

The finely divided amorphous silica described above imparts improved resistance toward water and also improves the crushing strength. The latter is shown in Table I, wherein "silex" is silica which has been ground and passes through a 200 mesh screen; "sand" is standard testing sand, passing 20 and retained on 30 mesh (the sand and silex both being silica in crystalline state); and VS is "volatilized silica," a descriptive term for the finely divided amorphous silica obtained as described above; the "solution" is 25° Bé. solution of magnesium chloride in water; and the MgO is an oxychloride grade, fast-setting plastic cement. The mixes are formed in 2 in. x 2 in. x 2 in. molds and the crushing strengths, determined after the molded pieces have cured for 8 days, represent an average of 6 specimens broken on a Southwark Emery testing machine.

Table I

| Mix No. | Parts by Weight | | | | $MgCl_2$ Solution, Parts by Vol. | Average Crushing Strength in lbs./sq. in. |
| --- | --- | --- | --- | --- | --- | --- |
| | MgO | VS | Silex | Sand | | |
| 1 | 227 | 0 | 453 | 1,135 | 250 | 5,008 |
| 2 | 227 | 227 | 227 | 1,135 | 175 | 11,150 |
| 3 | 227 | 113 | 340 | 1,135 | 225 | 8,130 |

This table indicates the great increase in crushing strength imparted to Sorel cement by substitution of even a minor proportion of the silex by the finely divided amorphous silica obtained as described.

Improved resistance toward water is demonstrated by the mixes of Table I also. Sample molds from the mixes 1, 2 and 3 are allowed to cure in air for 6 days and are then immersed in water for 14 days. They are then crushed on the testing machine and the average crushing strengths after immersion for the various mixes are as follows:

Table II

| | Lbs. per sq. in. |
| --- | --- |
| Mix No. 1 | 1,065 |
| Mix No. 2 | 8,335 |
| Mix No. 3 | 6,970 |

In another test, molded bars are prepared from two mixes: (1) an oxychloride cement made in the usual way and containing 1 part by weight of inert aggregate consisting of periclase which passes through a 120 mesh screen and 1 part by weight of plastic magnesium oxide, and (2) an oxychloride cement mix exactly like the first but containing also 1 part by weight of finely divided amorphous silica obtained by rapidly cooling the exhaust vapors from the ferrosilicon reduction zone. Both sets of bars are cured in air for 3 days and are then immersed in water for 20 days. At the end of this time the bars of the first oxychloride cement mix are bloated and cracked and the bond is disintegrated. On the other hand, the physical condition of the bars made from the mix containing the finely divided amorphous silica is substantially unchanged.

The following example shows the improved volume stability obtained by the incorporation of finely divided amorphous silica as described. Two bars of Sorel cement are formed, each bar being 4 in. x 4 in. in cross-section and 30 in. long. The first bar is prepared by admixing 1 part by weight of plastic MgO and 1 part by weight of silica which passes a 200 mesh screen, and gauging to suitable consistency with 25° Bé. magnesium chloride solution, and the finished mix is tamped well into the mold boxes. The second bar is prepared in exactly the same manner except that the mix is prepared by admixing 2 parts by weight of plastic MgO with 1 part by weight of silica which passes a 200 mesh screen and 1 part by weight of finely divided amorphous silica deposited from the exhaust gases from the ferrosilicon furnace. Before the test bars have acquired the initial set, two metal tabs are pressed into the surface of each bar and marks are scribed on these tabs 24 inches apart. After having been allowed to cure for four days, the bar without the volatilized silica grew three-sixteenths inch between the 24 inch marks, while the bar containing volatilized silica shows no volume change. After 7 months the bar made with volatilized silica has shown no appreciable change in length, while the bar without the volatilized silica has grown fully one-half inch.

The incorporation of volatilized silica in Sorel cement, according to this invention, also retards the setting time of the cement, which is advantageous in many applications. Five oxychloride cement mixes are prepared from magnesium oxide, four of which contain volatilized silica (VS) as described above, in the proportions indicated below. The mixes are prepared in the usual way, being mixed to the desired consistency with 25° Bé. magnesium chloride solution. Table III shows the slowing of the setting time as determined by Gilmore needles.

Table III

| Mix No. | Parts by Weight | | Initial Set | Final Set |
| --- | --- | --- | --- | --- |
| | MgO | VS | | |
| 1 | All | None | 1 hr. 52 min. | 2 hrs. 37 min. |
| 2 | 5 | 1 | 1 hr. 59 min. | 2 hrs. 54 min. |
| 3 | 3 | 1 | 1 hr. 41 min. | 2 hrs. 41 min. |
| 4 | 2 | 1 | 2 hrs. 17 min. | 3 hrs. 23 min. |
| 5 | 1 | 1 | 2 hrs. 25 min. | 4 hrs. 25 min. |

Other advantages obtained by the incorporation of the "volatilized" silica into magnesium oxychloride cements according to the invention are that cements so prepared can withstand treatment in an autoclave, under live steam, without undergoing appreciable change in volume or loss of strength, and that less magnesium chloride solution is required to reach a pouring or trowelling consistency and there is less tendency for the solution to puddle out at the surface (in other words that the plasticity of the mix is increased).

In the above examples about 20% or more of the finely divided amorphous silica, based on the amount of MgO, has been shown to be a useful addition. However, lesser amounts are sometimes advantageous, depending upon the amount of aggregate in the final mix, the purpose for which the cement is to be used, and the like. In general, additions of up to about 50% of the finely divided amorphous silica, based on the amount of MgO, are found particularly advantageous as more than this amount, while not harmful is not generally economical. However, it is not intended that these amounts be regarded as limiting. It is shown in Table I that an addition of 100% of this silica, based on the weight of MgO, increases the crushing strength before immersion to almost twice the increase effected by a 50% addition. It makes the product more expensive, however, and for usual practice a somewhat lower amount is satisfactory. The percentages are by weight.

Coloring pigments, fillers or inert grains, or mixtures thereof, can be added to the oxychloride cements of this invention, when desired. It is a further advantage of the incorporation of the finely divided amorphous silica as described that no color is imparted to the cement mix thereby.

While the cement mixes of the above examples have shown the admixture of the finely divided silica with magnesium oxide, such as plastic magnesium oxide, the silica described can also be added to magnesium hydroxide prior to calcination of that material to caustic or light-burned magnesium oxide, thereby obtaining an intimate mixture of these ingredients: The silica can be added to the calcined MgO prior to grinding, in which case the materials are intimately mixed during the grinding process, or the silica and ground MgO can be admixed by sifting together in dry state just prior to compounding the cement mix. Although the above examples and specific description have related to magnesium oxychloride cements, the finely divided amorphous silica of this invention is also an advantageous constituent of Sorel cements of the magnesium oxysulfate type.

Having now described the invention, what is claimed is:

1. Process for preparing magnesium oxychloride cement which comprises admixing with magnesium oxide at least 20% by weight, based on the amount of MgO, of finely divided amorphous silica obtained by cooling, in contact with an oxygen-yielding gas, gaseous silica-yielding material contained in vapors issuing from a zone wherein silica is reduced, said silica having a major proportion of particles less than about one micron in size, and treating said admixture with aqueous magnesium chloride solution.

2. Process for preparing magnesium oxychloride cement which comprises admixing plastic magnesium oxide with from about 20% to about 50%, based on the weight of said magnesium oxide, of finely divided amorphous silica deposited from the vapor phase from the exhaust gases issuing from a zone wherein ferrosilicon is being produced by reaction of silica with carbon in the presence of iron, said silica having a major proportion of particles less than about one micron in size, and treating said admixture with magnesium chloride solution.

3. Process for preparing magnesium oxychloride cement having increased strength and improved resistance toward water which comprises admixing one part by weight of plastic magnesium oxide with at least one-half part by weight of finely divided amorphous silica deposited from the vapor phase from the exhaust gases issuing from a zone wherein ferrosilicon is being produced by reaction of silica and carbon in the presence of iron, said silica having a major proportion of particles less than about one micron in size, and at least 6 parts by weight of crystalline silica, and treating said admixture with magnesium chloride solution.

4. A cementitious material of improved volume stability and improved resistance to water comprising magnesium oxychloride cement having incorporated therein at least 20% by weight, based on the MgO content, of amorphous silica consisting predominantly of spherical particles of less than one micron in diameter.

5. A cementitious material comprising a Sorel cement having incorporated therein at least about 20% by weight, based on the amount of MgO, of amorphous silica obtained by bringing into contact with an oxygen-yielding gas the exhaust vapors from a zone wherein ferrosilicon is being produced by reaction of silica with carbon in the presence of iron, said silica containing over 67% of spherical particles below one micron diameter and having an average diameter of about 330 millimicrons and a specific surface of about 67,500 square centimeters per gram.

6. A cementitous material comprising a Sorel cement having incorporated therein at least about 20% by weight, based on the amount of MgO, of finely divided amorphous silica consisting predominantly of spherical particles below one micron diameter and obtained by reducing silica with a carbonaceous reducing agent at a temperature sufficient to produce vaporous products of reduction, bringing said vaporous products into contact with an oxygen-yielding gas, and recovering solid silica deposited thereby.

7. A cementitious material comprising a magnesium oxychloride cement having incorporated therein at least about 20% by weight, based on the amount of MgO, of finely divided amorphous silica consisting predominantly of spherical particles below one micron diameter and obtained by reducing silica with a carbonaceous reducing agent at a temperature sufficient to produce vaporous products of reduction, bringing said vaporous products into contact with an oxygen-yielding gas, and recovering solid silica deposited thereby.

8. A cementitious material comprising a magnesium oxychloride cement having incorporated therein at least about 20% by weight, based on the amount of MgO, of finely divided amorphous silica obtained by bringing into contact with an oxygen-yielding gas the exhaust vapors from a zone wherein ferro-silicon is being produced by reaction of silica with carbon in the presence of iron, said silica containing over 67% of spherical particles of less than one micron diameter and having an average diameter of about 330 millimicrons and a specific surface of about 67,500 square centimeters per gram.

9. A cementitious material comprising a Sorel cement having incorporated therein at least 20% by weight, based on the amount of MgO, of amorphous silica having a major proportion of particles less than about one micron in size.

10. A cementitious material comprising a Sorel cement having incorporated therein an amount at least about 20% by weight of the MgO content of finely divided amorphous silica formed by deposition thereof from the vapor state, the major portion of said silica having a particle size less than about one micron.

11. A process for preparing magnesium oxychloride cement which comprises admixing with magnesium oxide at least about 20% by weight of the MgO finely divided amorphous silica formed by deposition on cooling silica in the vapor phase, said silica having a major portion of particles less than about one micron in size, and treating said admixture with magnesium chloride solution.

LESLIE W. AUSTIN.
DANIEL RHODES.

REFERENCES CITED

The following references are of record in the file of this patent:

UNITED STATES PATENTS

| Number | Name | Date |
|---|---|---|
| 908,133 | Potter | Dec. 29, 1908 |
| 1,368,949 | Loeffelhardt | Feb. 15, 1921 |
| 1,404,438 | Holmberg | Jan. 24, 1922 |
| 2,001,608 | Gilbert | May 14, 1935 |
| 2,013,132 | Cailloux | Sept. 3, 1935 |
| 2,333,948 | Muskat | Nov. 9, 1943 |
| 2,410,954 | Sharp | Nov. 12, 1946 |